US006386176B1

United States Patent
McGee (10) Patent No.: US 6,386,176 B1
(45) Date of Patent: May 14, 2002

(54) METHOD AND APPARATUS FOR DETERMINING A START ANGLE FOR A FUEL INJECTION ASSOCIATED WITH A FUEL INJECTION SIGNAL

(75) Inventor: Brian G. McGee, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/616,003

(22) Filed: Jul. 13, 2000

(51) Int. Cl.$^7$ .................................................. F02B 3/06
(52) U.S. Cl. ......................... 123/299; 123/300; 123/500
(58) Field of Search ............................... 123/299, 300, 123/305, 500, 501

(56) References Cited

U.S. PATENT DOCUMENTS

| | | |
|---|---|---|
| 4,571,683 A | 2/1986 | Kobayashi et al. |
| 4,576,135 A | 3/1986 | Johnson |
| 4,621,599 A | 11/1986 | Igashira et al. |
| 4,704,999 A | 11/1987 | Hashikawa et al. |
| 4,729,056 A | 3/1988 | Edwards et al. |
| 4,836,161 A | 6/1989 | Abthoff et al. |
| 4,922,878 A | 5/1990 | Shinogle et al. |
| 5,020,979 A | 6/1991 | Askew |
| 5,070,836 A | 12/1991 | Wahl et al. |
| 5,113,833 A | 5/1992 | Nagano et al. |
| 5,245,972 A | 9/1993 | Denz et al. |
| 5,267,545 A | 12/1993 | Kitson |
| 5,268,842 A | 12/1993 | Martson et al. |
| 5,277,164 A | 1/1994 | Takahashi et al. |
| 5,320,079 A | 6/1994 | Kuwabara |
| 5,379,733 A | 1/1995 | Haddick et al. |
| 5,427,072 A | 6/1995 | Udo |
| 5,427,083 A | 6/1995 | Ahern |
| 5,450,829 A | 9/1995 | Beck |
| 5,460,128 A | 10/1995 | Kruse |
| 5,492,098 A | 2/1996 | Hafner et al. |
| 5,499,608 A | 3/1996 | Meister et al. |
| 5,507,260 A | 4/1996 | Hintzen |
| 5,540,205 A | 7/1996 | Davis et al. |
| 5,549,092 A | 8/1996 | Hasegawa et al. |
| 5,566,650 A | 10/1996 | Kruse |
| 5,566,660 A | 10/1996 | Camplin et al. |
| 5,588,415 A | 12/1996 | Ahern |
| 5,609,131 A | 3/1997 | Gray, Jr. et al. |
| 5,634,448 A | 6/1997 | Shinogle et al. |
| 5,647,317 A | 7/1997 | Weisman, II et al. |
| 5,678,521 A | 10/1997 | Thompson et al. |
| 5,685,273 A | 11/1997 | Johnson et al. |

(List continued on next page.)

FOREIGN PATENT DOCUMENTS

EP      0 221 832 A2      5/1987

OTHER PUBLICATIONS

SAE Feb. 24–27, 1997 A New Concept for Low Emission Diesel Combusion—Printed from Diesel Engine Combustion Processes and Emission Control Technologies (SP–1246).

*Primary Examiner*—Thomas N. Moulis (57) ABSTRACT

A fuel injection control system and method for determining a start angle for a fuel injection event based upon engine speed. A controller is coupled to a plurality of fuel injectors associated with the engine and is operable to convert a predetermined timing trim value associated with each fuel injector to an angle trim value. The controller is further operable to determine a relative injection angle value for each cylinder by adding the angle trim value to a predetermined advanced pilot timing angle value and a predetermined main shot timing angle value; to compare the relative injection angle value to a maximum allowable relative injection angle value and set the relative injection angle value to the maximum if the determined relative injection angle value exceeds the maximum allowable relative injection angle value; and to determine an absolute injection angle value for each cylinder by adding the relative injection angle value to a predetermined cylinder top-dead-center offset value associated with the fuel injector for a particular cylinder. The absolute injection angle value corresponds to the position of the cylinder piston during a particular fuel injection event.

35 Claims, 4 Drawing Sheets

U.S. PATENT DOCUMENTS

| | | |
|---|---|---|
| 5,701,870 A | 12/1997 | Gottshall et al. |
| 5,704,336 A | 1/1998 | Wrobel |
| 5,722,373 A | 3/1998 | Paul et al. |
| 5,732,680 A | 3/1998 | Ninomiya et al. |
| 5,740,775 A | 4/1998 | Suzuki et al. |
| 5,740,776 A | 4/1998 | Enderle et al. |
| 5,746,183 A | 5/1998 | Parke et al. |
| 5,778,850 A | 7/1998 | Buratti et al. |
| 5,794,585 A | 8/1998 | Yonezawa et al. |
| 5,803,049 A | 9/1998 | Harcombe |
| 5,829,412 A * | 11/1998 | Klatt et al. ............ 123/500 |
| 5,832,901 A | 11/1998 | Yoshida et al. |
| 5,839,275 A | 11/1998 | Hirota et al. |
| 5,865,153 A | 2/1999 | Matsumoto |
| 5,865,158 A | 2/1999 | Cleveland et al. |
| 5,893,347 A | 4/1999 | McGee et al. |
| 5,979,398 A | 11/1999 | Yanagihara |
| 5,979,412 A | 11/1999 | Werner |
| 5,986,871 A | 11/1999 | Forck et al. |
| 6,000,384 A | 12/1999 | Brown et al. |
| 6,006,727 A | 12/1999 | Katashiba et al. |
| 6,009,849 A | 1/2000 | Yamanoto et al. |
| 6,014,956 A | 1/2000 | Cowden et al. |
| 6,021,370 A | 2/2000 | Bellinger et al. |
| 6,026,780 A | 2/2000 | Barnes et al. |
| 6,032,642 A | 3/2000 | Trumbower et al. |
| 6,044,824 A | 4/2000 | Mamiya et al. |
| 6,234,140 B1 * | 5/2001 | Mentgen et al. ............ 123/305 |
| 6,234,145 B1 * | 5/2001 | Shomura ............... 123/406.24 |

* cited by examiner

METHOD AND APPARATUS FOR DETERMINING A START ANGLE FOR A FUEL INJECTION ASSOCIATED WITH A FUEL INJECTION SIGNAL

TECHNICAL FIELD

This invention relates generally to fuel injection control systems and, more particularly, to a control system for determining the start of fuel injection events in a multi-shot fuel injection signal for each cylinder of an engine wherein the main injection timing is preserved when the start of the injection event becomes too advanced.

BACKGROUND ART

Electronically controlled fuel injectors are well known in the art including both hydraulically actuated electronically controlled fuel injectors as well as mechanically actuated electronically controlled fuel injectors. Electronically controlled fuel injectors typically inject fuel into a specific engine cylinder as a function of an injection signal received from an electronic controller. These signals include waveforms that are indicative of a desired injection rate as well as the desired timing and quantity of fuel to be injected into the cylinders. Regulations pertaining to engine exhaust emissions are becoming increasingly restrictive throughout the world including, for example, restrictions on the emission of hydrocarbons, carbon monoxide, the release of particulates, and the release of oxides of nitrogen ($NO_x$). Tailoring the number of injections and the injection rate of fuel to a combustion chamber, as well as the desired quantity and timing of such fuel injections, is one way in which to control emissions of an engine and meet such emission standards. As a result, multi-shot fuel injection techniques have been utilized to modify the burn characteristics of the combustion process in an attempt to reduce emission and noise levels. Multi-shot injection typically involves splitting the total fuel delivery to the cylinder during a particular injection event into two or more separate fuel injections generally referred to as a pilot injection, a main injection, and an anchor injection, which injections may each be referred to generally as a shot. As used throughout this disclosure, an injection event is defined as the injections that occur in a cylinder during one cycle of the engine. For example, one cycle of a four cycle engine for a particular cylinder, includes an intake, compression, expansion, and exhaust stroke. Therefore, the injection event in a four stroke engine includes the number of injections, or shots, that occur in a cylinder during the four strokes of the piston. The term shot as used in the art may also refer to the actual fuel injection or to the command current signal to a fuel injector or other fuel actuation device indicative of an injection or delivery of fuel to the engine. At different engine operating conditions, it may be necessary to use different injection strategies in order to achieve both desired engine operation and emissions control. For example, at higher engine speeds, the controllability of distinct fuel shots relative to each other in a multi-shot fuel injection signal is somewhat more difficult because of issues associated with high engine speeds. For example, if higher engine speeds are not accounted for, the total time duration of the fuel injection signal may decrease, whereby the time delay between the end of one fuel shot and the beginning of a subsequent fuel shot decreases. At significantly high engine speeds, the time delay may decrease below a minimum acceptable level, and the fuel shots may even overlap. This is disadvantageous to the performance, fuel efficiency, and emissions of the engine. Even with more advanced electronically controlled fuel injectors, during high speed engine operating conditions it is sometimes difficult to accurately control the timing of fuel delivery associated with each shot despite the use of electrical current control signals.

In a fuel control system having one driver or controller to control multiple injectors, it is desirable not to command injection signals to two injectors at the same time. The undesirability of generating simultaneous command signals to multiple injectors is due in part to the physical limitations of having a single driver. However, as engine operating conditions change, the number, timing, and duration of injection signals may vary to accommodate desired emissions and engine performance. Therefore, adverse system performance may result if the overall injection timings of the cylinders are not dynamically monitored to avoid injection collisions.

Accordingly, in a system in which multiple fuel injections and different injection waveforms are achievable, it is desirable to control the delivery of individual fuel shots in each fuel injection event so as to minimize overall emissions and fuel consumption of the engine.

Accordingly, the present invention is directed to overcoming one or more of the problems as set forth above.

DISCLOSURE OF THE INVENTION

In one aspect of the present invention, there is disclosed an electronically controlled fuel injection system capable of delivering fuel injection signals, including a plurality of fuel injection shots, to the cylinders of an internal combustion engine during a single fuel injection event. The system includes at least one fuel injection device, such as a fuel injector, associated with each cylinder and operable to deliver the multiple fuel shots, and a controller operable to determine the timing and actual amounts of fuel for each shot.

In one embodiment of the present invention, the controller is operable to provide fuel injection signals comprising three distinct fuel shots, namely a pilot shot, a main shot, and an anchor shot. Each fuel injection signal corresponds to a particular cylinder in an engine. The controller is further operable to determine a desired start time for the pilot shot, and an angular position of the piston that corresponds to such desired start time for the pilot shot, for each fuel injection event.

For a particular cylinder in the engine, the controller is operable to convert that cylinder's timing trim to an angle. The controller thereupon determines a relative injection angle of the first shot, e.g., pilot shot, for the cylinder, which angle is the sum of the cylinder's timing trim angle, its advanced pilot timing angle, and its main shot timing angle. If the determined relative injection angle is greater than a predetermined threshold value for the maximum relative injection angle allowed for that cylinder, then the controller is operable to set the relative injection angle of that cylinder to its maximum allowable relative injection angle. The controller can thereupon determine that cylinder's absolute injection angle for the respective fuel injection event by adding the cylinder's top dead center offset value, which offset value is a predetermined known value available to the controller, to the cylinder's relative injection angle. The controller then updates the cylinder's absolute injection angle value with the absolute injection angle value thus determined. The controller is operable to perform these steps in a loop for each cylinder in the engine for each fuel injection event, and the entire procedure is thereafter repeated for subsequent fuel injection events.

BRIEF DESCRIPTION OF THE DRAWINGS

For a better understanding of the present invention, reference may be made to the accompanying drawings in which.

BEST MODE FOR CARRYING OUT THE INVENTION

Figure 1:
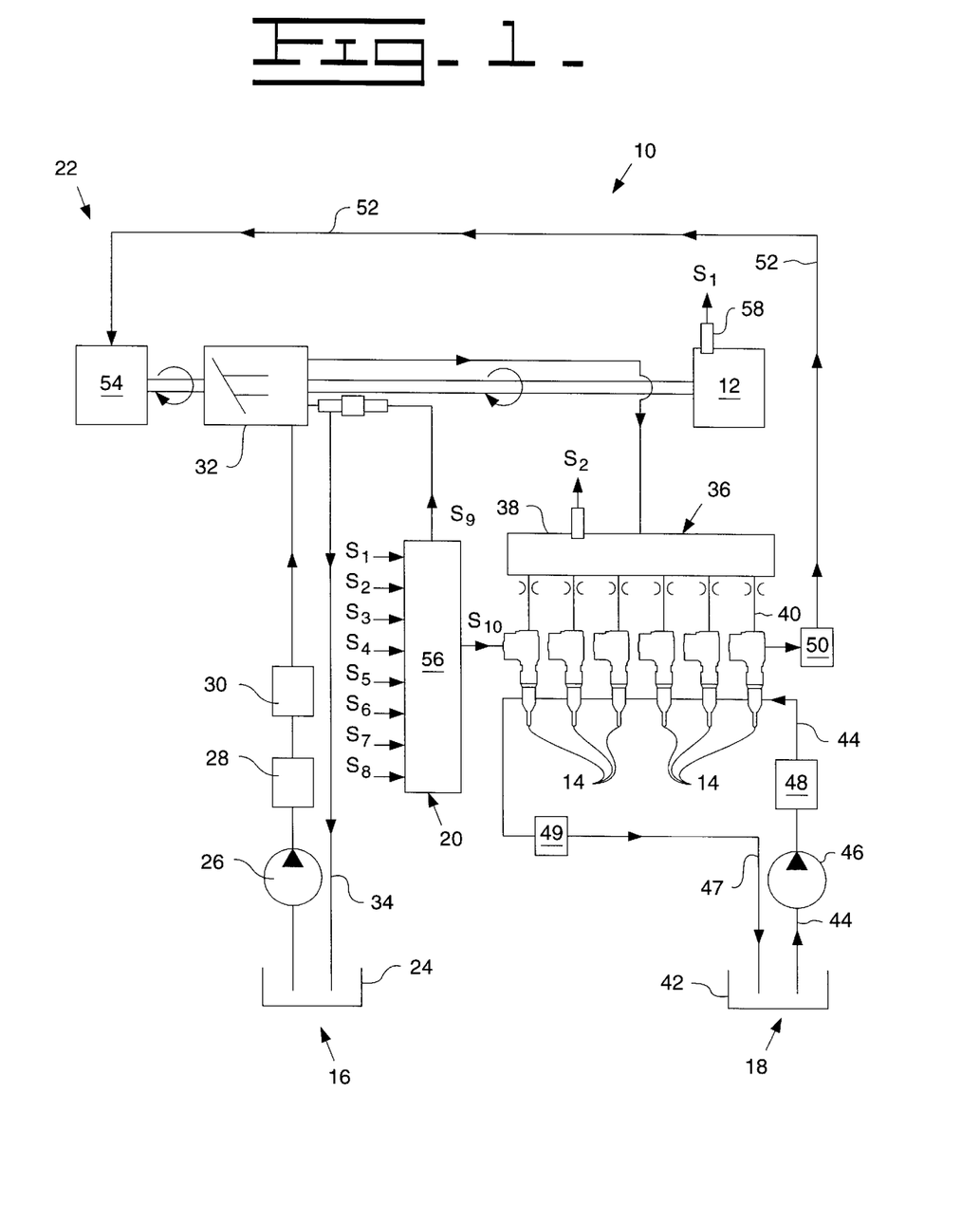
FIG. 1 is a schematic view of an electronically controlled fuel injector system used in connection with one embodiment of the present invention.

Referring to FIG. 1, there is shown one embodiment of a hydraulically actuated electronically controlled fuel injection system 10 in an exemplary configuration as adapted for a direct-injection compression ignition engine 12. Fuel system 10 includes one or more electronically controlled fuel injection devices, such as fuel injector 14, which are adapted to be positioned in a respective cylinder head bore of the engine 12. While the embodiment of FIG. 1 applies to an in-line six cylinder engine, it is recognized and anticipated, and it is to be understood, that the present invention is also likewise applicable to other types of engines such as V-type engines and rotary engines, and that the engine may contain any plurality of cylinders or combustion chambers. In addition, while the embodiment of FIG. 1 also illustrates a hydraulically actuated electronically controlled fuel injector system, it is likewise recognized and anticipated that the present invention is also equally applicable to other types of fuel injection devices, including electronically controlled injectors, mechanically actuated electronically controlled injector units, as well as fluid activated common rail type fuel injection systems with digitally controlled fuel valves.

The fuel system 10 of FIG. 1 includes an apparatus or means 16 for supplying actuation fluid to each injector 14, an apparatus or means 18 for supplying fuel to each injector, electronic control means 20 for controlling the fuel injection system including the manner and frequency in which fuel is injected by the injectors 14 including timing, number of injections per injection event, fuel quantity per injection, time delay between each injection, and the injection profile. Thus, each injector 14 is operable to deliver a plurality of fuel injections, or shots of fuel, during each injection event. The system may also include apparatus or means 22 for recirculating fluid and/or recovering hydraulic energy from the actuation fluid leaving each injector 14.

The actuating fluid supply means 16 preferably includes an actuating fluid sump or reservoir 24, a relatively low pressure actuating fluid transfer pump 26, an actuating fluid cooler 28, one or more actuation fluid filters 30, a high pressure pump 32 for generating relatively high pressure in the actuation fluid, and at least one relatively high pressure actuation fluid manifold or rail 36. A common rail passage 38 is arranged in fluid communication with the outlet from the relatively high pressure actuation fluid pump 32. A rail branch passage 40 connects the actuation fluid inlet of each injector 14 to the high pressure common rail passage 38. In the case of a mechanically actuated electronically controlled injector, manifold 36, common rail passage 38 and branch passages 40 would typically be replaced with some type of cam actuating arrangement or other mechanical means for actuating such injectors. Examples of a mechanically actuated electronically controlled fuel injector unit are disclosed in U.S. Pat. Nos. 5,947,380 and 5,407,131.

Apparatus 22 may include a waste accumulating fluid control valve 50 for each injector, a common recirculation line 52, and a hydraulic motor 54 connected between the actuating fluid pump 32 and recirculation line 52. Actuation fluid leaving an actuation fluid drain of each injector 14 would enter the recirculation line 52 that carries such fluid to the hydraulic energy recirculating or recovering means 22. A portion of the recirculated actuation fluid is channeled to high pressure actuation fluid pump 32 and another portion is returned to actuation fluid sump 24 via recirculation line 34.

In a preferred embodiment, the actuation fluid is engine lubricating oil and the actuating fluid sump 24 is an engine lubrication oil sump. This allows the fuel injection system to be connected as a parasitic subsystem to the engine's lubricating oil circulation system. Alternatively, the actuating fluid could be fuel.

The fuel supply means 18 preferably includes a fuel tank 42, a fuel supply passage 44 arranged in fluid communication between the fuel tank 42 and the fuel inlet of each injector 14, a relatively low pressure fuel transfer pump 46, one or more fuel filters 48, a fuel supply regulating valve 49, and a fuel circulation and return passage 47 arranged in fluid communication between each injector 14 and fuel tank 42.

Electronic control means 20 preferably includes an electronic control module (ECM) 56, also referred to as a controller, the general use of which is well known in the art. ECM 56 typically includes processing means such as a microcontroller or microprocessor, a governor such as a proportional integral derivative (PID) controller for regulating engine speed, and circuitry including input/output circuitry, power supply circuitry, signal conditioning circuitry, solenoid driver circuitry, analog circuits and/or programmed logic arrays as well as associated memory. The memory is connected to the microcontroller or microprocessor and stores instruction sets, maps, lookup tables, variables, and more. ECM 56 may be used to control many aspects of fuel injection including (1) the fuel injection signal timing, including the individual timings of the distinct fuel shots in the fuel injection signal, (2) the fuel injection quantity during an injection event, (3) the fuel injection pressure, (4) the number of separate injections or fuel shots during each injection event, (5) the time intervals between the separate injections or fuel shots, (6) the time duration of each injection or fuel shot, (7) the fuel quantity associated with each injection or fuel shot, (8) the actuation fluid pressure, (9) current level of the injector waveform, and (10) any combination of the above parameters. Each of such parameters are variably controllable independent of engine speed and load. ECM 56 receives a plurality of sensor input signals $S_1$–$S_8$ which correspond to known sensor inputs such as engine operating conditions including engine speed, engine temperature, pressure of the actuation fluid, cylinder piston position and so forth that are used to determine the precise combination of injection parameters for a subsequent injection event.

For example, an engine temperature sensor 58 is illustrated in FIG. 1 connected to engine 12. In one embodiment, the engine temperature sensor includes an engine oil temperature sensor. However, an engine coolant temperature sensor can also be used to detect the engine temperature. The engine temperature sensor 58 produces a signal designated by $S_1$ in FIG. 1 and is inputted to ECM 56 over line $S_1$. In the particular example illustrated in FIG. 1, ECM 56 issues control signal $S_9$ to control the actuation fluid pressure from pump 32 and a fuel injection signal $S_{10}$ to energize a solenoid or other electrical actuating device within each fuel injector thereby controlling fuel control valves within each injector 14 and causing fuel to be injected into each corresponding engine cylinder. Each of the injection parameters are variably controllable, independent of engine speed and load. In the case of the fuel injectors 14, control signal $S_{10}$ is a fuel injection signal that is an ECM commanded current to the injector solenoid or other electrical actuator.

Figure 2:
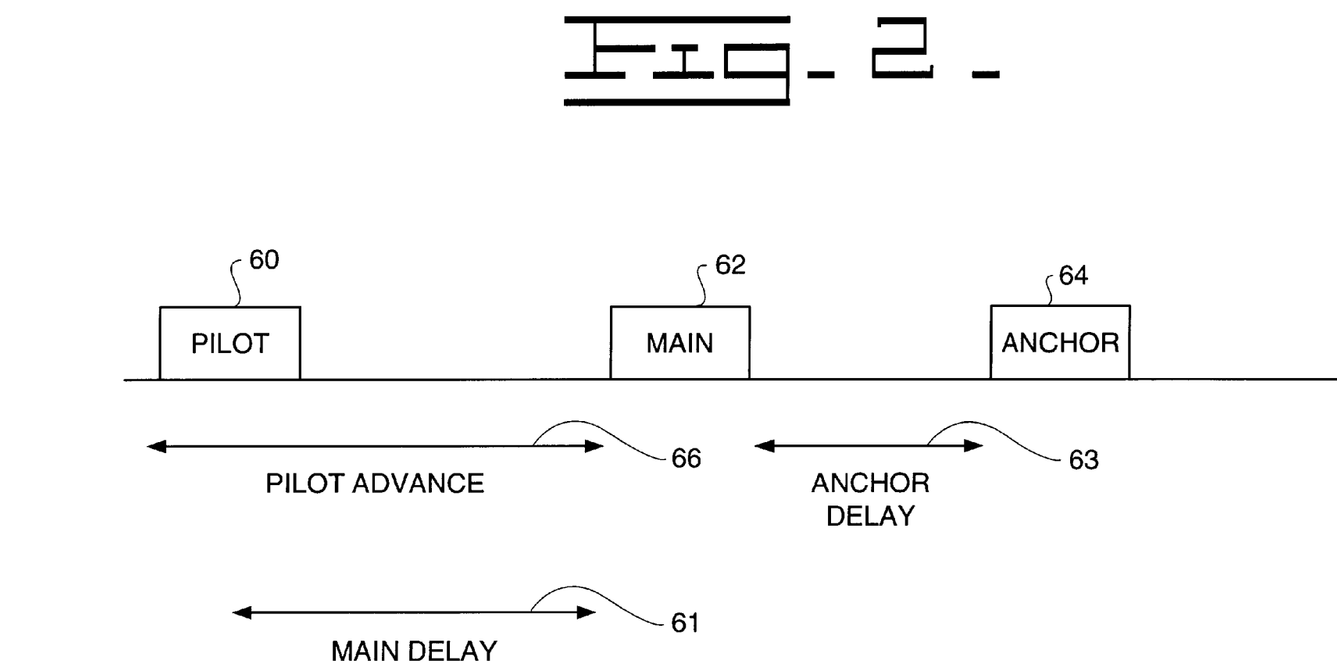
FIG. 2 is a schematic profile of a three shot fuel injection signal.

It is recognized that the type of fuel injection desired during any particular fuel injection event will typically vary depending upon various engine operating conditions. In an effort to improve emissions, it has been found that delivering multiple fuel injections to a particular cylinder during a fuel injection event at varying engine operating conditions may achieve both desired engine operation as well as emissions control. FIG. 2 illustrates a multiple injection including three separate fuel injections, namely, a first fuel injection or pilot shot 60, a second fuel injection or main shot 62, and a third fuel injection or anchor shot 64. As illustrated in FIG. 2, the pilot shot 60 is injected into the combustion chamber in advance of the main shot 62 by some predetermined time factor, crank angle or main delay 61, and the anchor shot is sequenced after the main shot 62 based upon a predetermined time factor, crank angle or anchor delay 63. Based upon programming associated with electronic controller 56 as well as a variety of different maps and/or lookup tables stored within the memory of controller 56 including maps and/or tables relating to engine speed, engine load, the pressure associated with rail passage 38 (rail pressure), desired total fuel quantity and other parameters, controller 56 will be able to dynamically determine the appropriate number of fuel shots, the quantity of fuel required for each fuel shot, and partition the same accordingly, and it will be able to determine the timing and duration of each individual shot as well as the anchor delay 63. In the three shot multiple injection event depicted in FIG. 2, a portion of the total fuel to be delivered to the combustion chamber will be injected in the pilot shot 60, a portion of such total fuel will be injected in the main shot 62, and a remaining portion of the total fuel to be injected will be injected in the anchor shot 64. A three shot multiple fuel injection has advantages in terms of exhaust emissions, including reduced particulate emissions and/or reduced $NO_x$ emissions as well as desired engine performance at many engine operating conditions.

The present invention is directed to dynamically determining a desired start time for the first fuel shot of a particular fuel injection event, and determining the angular position of the piston that corresponds to such desired start time for such first fuel shot for each fuel injection event. It is understood that the present invention will be associated with the overall fuel delivery or fuel injection process associated with a wide variety of different engines. The present invention includes the steps of sensing and establishing various relevant parameters associated with the operation of an engine such as engine speed and/or engine load, and based upon these sensed conditions and appropriate predetermined maps and/or other calculations and/or variables, the total desired fuel quantity for a particular fuel injection event will be determined based upon the operating condition of the engine. In addition, based upon the total desired fuel quantity and other parameters associated with a particular injection event, the total number of desired fuel shots for the particular injection event will be determined as well as the desired fuel quantity for each fuel shot associated therewith. The fuel partitioning process will involve determining various parameters associated with each fuel shot such as the amount of fuel desired in each particular shot, the desired spacing between the respective shots, and other relevant parameters whereby a fuel injection waveform or fuel injection current signal may be determined. Once the number of fuel shots and the amount of fuel associated with each fuel shot is determined, the injection angle for the start of the fuel injection event will be determined in accordance with the teachings of the present invention disclosed herein. A fuel injection signal indicative of the particular fuel shot parameters including the desired start time for the first fuel shot, and the angular position of the piston that corresponds to the desired start time for that first fuel shot would then be determined and delivered to the fuel injection devices associated with the engine.

Referring to FIG. 2, those skilled in the art will appreciate that the partitioning of a fuel injection signal into multiple shots, such as a pilot shot 60, a main shot 62, and an anchor shot 64 is accomplished by establishing distinct start times for each shot. It is typically desirable to have at least a minimum time delay between the end of the pilot shot and the beginning of the main shot, which delay is termed a main delay, to achieve desired performance and emissions from engine 12. Likewise, it is preferable to separate the anchor shot from the main shot by a certain time delay, which delay is termed an anchor delay in the art, to achieve desired performance and emissions of engine 12. The time delays between the shots, and therefore the starting time of each shot, may be translated to an angular position of the piston. Such conversion of a time delay to an angular position at a particular engine speed is calculated by the following formula, which is discussed in more detail below:

$$\text{Angle}=\text{time(secs)}\times 6\times \text{engine speed(rpm)}$$

Figure 3:
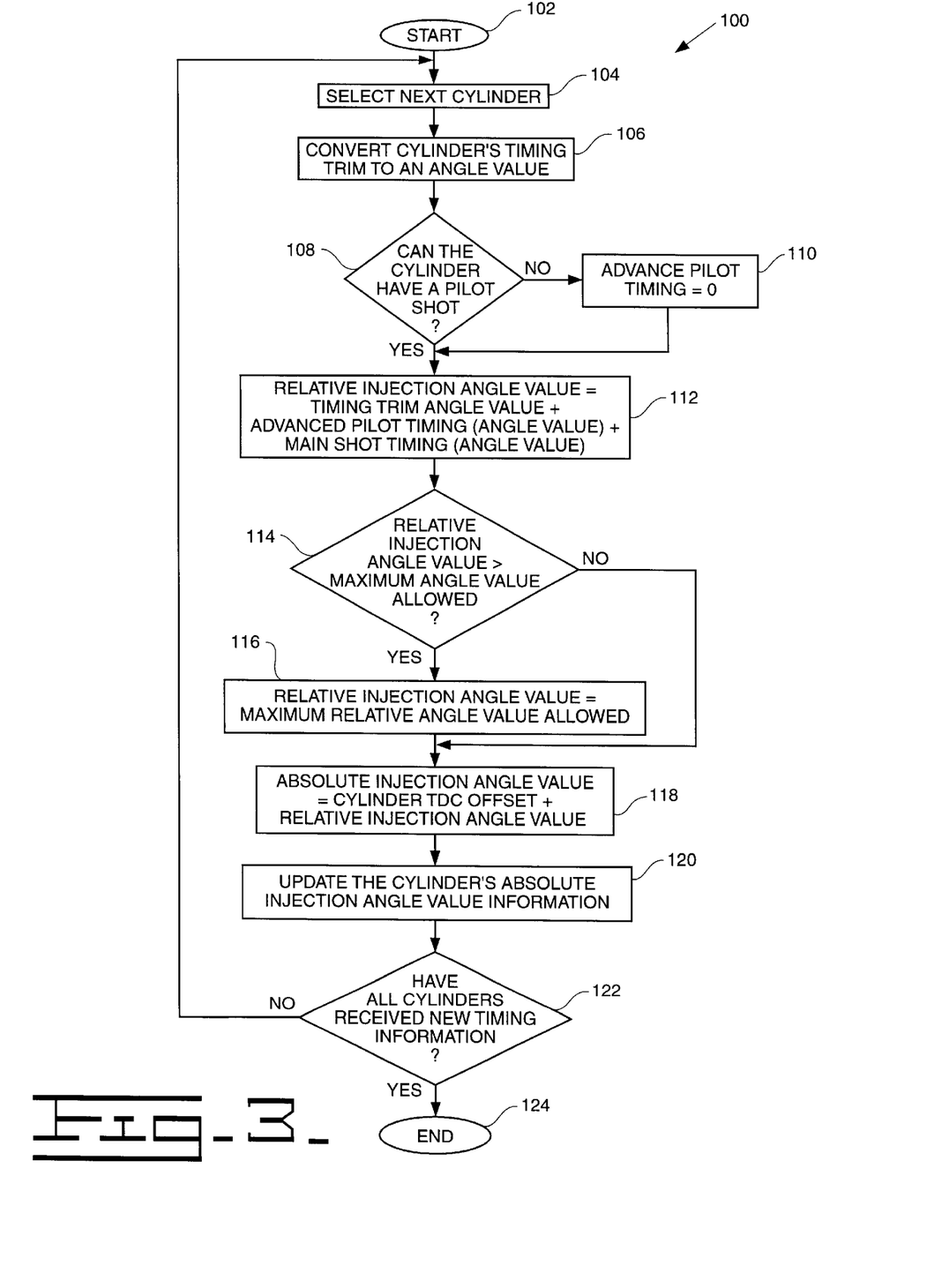
FIG. 3 is a schematic block diagram illustrating determination of an absolute injection angle value for a pilot shot in fuel injection signals for the cylinders of an engine.

Referring to FIG. 3, the determination of an absolute injection angle for fuel injectors 14 for a particular fuel injection event is accomplished by the group of steps illustrated in a flowchart generally designated 100. The absolute injection angle, generally, is the specific piston position or location for a specific cylinder in the engine during a combustion event at which the electronic sequence commences. Flowchart 100 is preferably stored on a computer readable medium such as memory or a data storage means associated with ECM 56. Further, ECM 56 is operable to generate signals $S_{10}$ for transmission to fuel injectors 14 through a computer readable data transmission medium which can be placed in communication with a diagnostic design display and input apparatus (not shown) including a display and keypad.

Referring to flowchart 100 in FIG. 3, execution is commenced at step 102. At step 104, a cylinder in engine 12 is selected for determining an absolute injection angle value for a respective fuel injection event. Engine 12, as discussed, will typically have a plurality of cylinders therein, and the sequence of the combustion events occurring in the cylinders may be predetermined in any one of the various sequences known in the art. For example, in one embodiment of the present invention, the predetermined sequence of cylinder firings is as follows:

Cyl 1-cyl 5-cyl 3-cyl 6-cyl 2-cyl 4.

However, it is recognized and anticipated that such sequence will typically depend upon a particular embodiment of the present invention. For example, whatever the sequence may be, the next cylinder to have fuel injected into it, if a calculation has not already been performed, is selected and the determination of start angle is made for that respective fuel injector and cylinder.

In the preferred embodiment, a timing trim is established for each of the shots. The timing trim is an established, injector specific, offset that will enable each injector deliver the same quantity of fuel given the same injection command signal is received. However, it is understood, that an alternative embodiment of the present invention may be implemented that does not establish or utilize a timing trim, or offset for the injection shots, or injectors. Upon selecting a cylinder at step 104, ECM 56 converts the particular cylinder's timing trim value to an angular value at step 106. The timing trim value is preferably a predetermined time compensation value associated with a particular fuel injector 14, and is typically unique for each injector 14. The purpose thereof is to adjust or compensate for differences or tolerances in each injector that may be inherent thereto or that may have arisen during the manufacturing process thereof. Incorporating each injector's timing trim value in the operation thereof will facilitate substantially identical operation for all injectors during operation of engine 12. The timing trim value, therefore, effectively trims out any differences between the various injectors (14). The timing trim value is a predetermined value, and is available to ECM 56 at step 106 in software or in a data storage means associated with ECM 56. The timing trim value will usually be available to ECM 56 at step 106 in time domain, that is in seconds, which can be converted to an angle value by using the formula set forth above. However, it is recognized and anticipated that there are several ways to do this, for example, adding a fuel quantity offset to determine an injection amount, then converting that value to a time or crank angle value. Those skilled in the art will appreciate that the angular value corresponding to the respective time value will depend upon the present engine speed of engine 12, whereby the timing trim value may be stored as a time value rather than an angular value, and the corresponding angular value is recalculated or determined for each fuel injection event. Those skilled in the art will also appreciate that such recalculation of the angular value for each fuel injection event will take into account the present or current engine speed thereby improving the accuracy of the angular value and the performance of engine 12 at all engine speeds.

Figure 4:
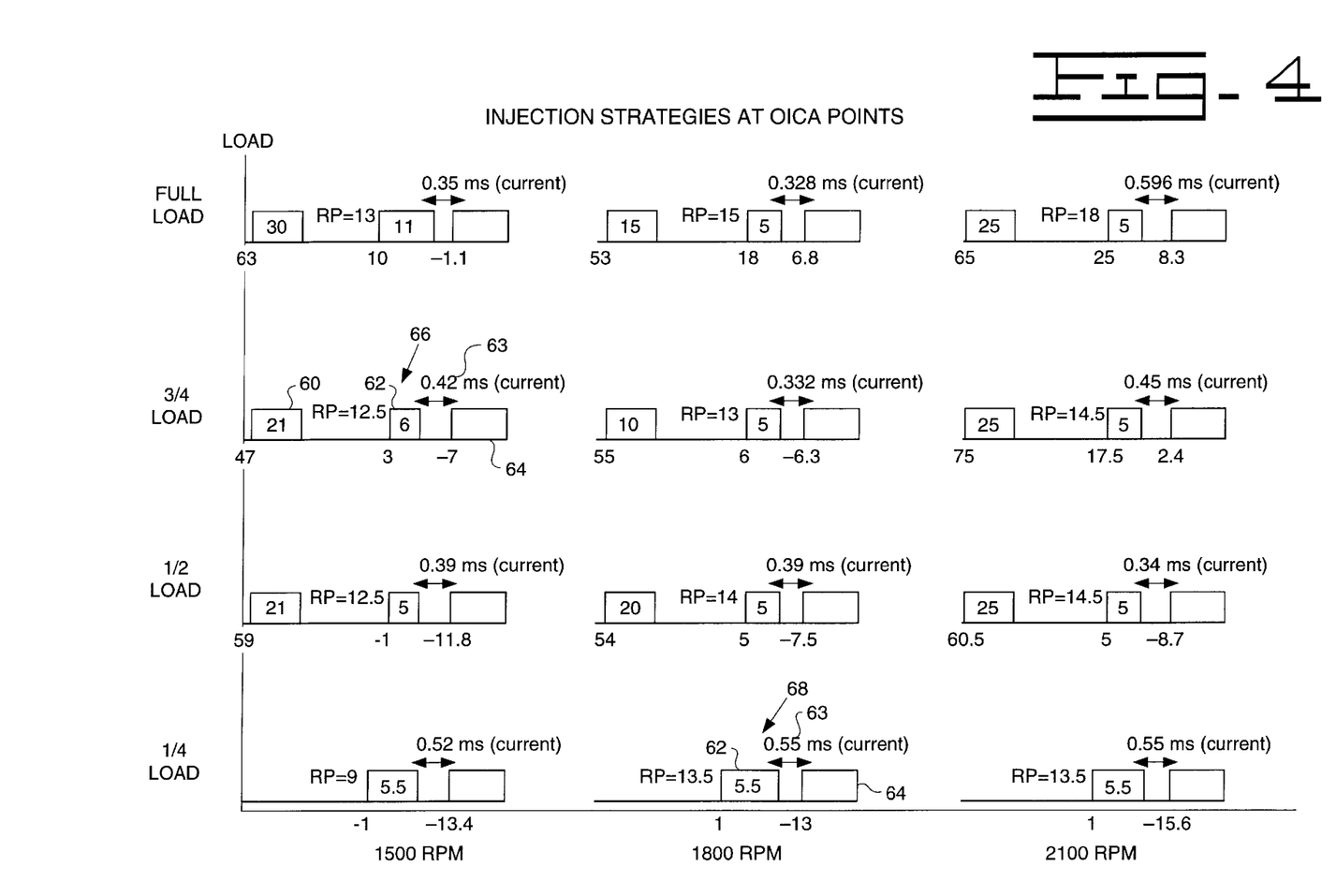
FIG. 4 is a chart illustrating an example of the injection strategies for steady state emissions taken at certain engine operating conditions based upon engine speed and engine load.

At step 108, ECM 56 determines whether the cylinder selected at step 104 will receive a pilot shot for the respective fuel injection event. The information whether the cylinder will receive a pilot shot is determined in accordance with other programming associated with ECM 56 and such determined information will be available to ECM 56 at step 108. It is recognized and anticipated that such other programming may determine whether the cylinder may have a pilot shot based upon any number of parameters and current engine performance parameters such as engine speed, engine acceleration or deceleration, load, engine temperature, and the like. For example, FIG. 4 illustrates one example of a multiple shot fuel injection strategy. That is, for a given speed and a given load, the map illustrated in FIG. 4 may be utilized to determine the desired number of shots, desired fuel quantity for the shots, and the desired timing of the shots of an injection event. A fuel injection strategy may be utilized to determine if a pilot shot is desired, and if so, the desired timing and quantity associated with the pilot shot. If it is determined at step 108 that the cylinder will not have a pilot shot during the respective fuel injection event, then ECM 56 sets an advanced pilot timing value to zero at step 110 and proceeds to step 112. Setting the pilot advance timing 66 (FIG. 2) to zero simply means that the particular fuel injection shot for that particular event will not include pilot shot 60. On the other hand, if it is determined at step 108 that the cylinder will have a pilot shot, then ECM 56 simply proceeds to step 112.

At step 112, ECM 56 calculates the value of a relative injection angle value for the cylinder selected at step 104. The relative injection angle value is generally a dynamically determined angular distance from a top dead center position or location of the piston during the compression stroke for a fuel injection event at which it is desired to inject fuel into a cylinder. In one embodiment, the relative injection angle value is calculated by the following formula:

Relative Injection Angle=Timing Trim Angle+Advanced Pilot Timing Angle+Main Shot Timing Angle The timing trim angle is available to ECM 56 at step 112 as calculated at step 106. The main shot timing angle value may be either stored in a map associated with electronic control means 20 and the contents of the map are accessible to ECM 56 during operation, or the value may be calculated by ECM 56 by a predetermined equation or formula. It is recognized and anticipated that the map or equation values may incorporate engine operating conditions such as temperature, engine load, engine speed, altitude, and the like for determining the main shot timing value for each fuel injection event. For example, a map indicative of a desired fuel injection strategy, such as is illustrated in FIG. 4, may be utilized to determine the main shot timing angle. In one embodiment of the present invention, the main shot timing angle value may be determined or calculated dynamically and updated in a predetermined memory location, or data storage location, associated with ECM 56 and ECM 56 may be programmed to retrieve that value from such memory or data storage location as needed. The dynamic calculations may be triggered at fixed predetermined time intervals, or they may be triggered by the occurrence of one or more predetermined conditions or criteria being satisfied, whereby the main shot timing angle value will be updated as desirable and the most recent value thus determined or calculated will be available to ECM 56 at step 112. Accordingly, the main shot timing value will also be available to ECM 56 at step 112.

The advance pilot timing angle value is predetermined in accordance with other programming associated with ECM 56 and such predetermined information will likewise be available to ECM 56 at step 112. It is recognized and anticipated that the advance pilot timing angle value may be based upon various parameters associated with the type of engine and the current operating conditions of the engine, and that such value will usually vary for each fuel injection event. For example, a map indicative of a desired fuel injection strategy, such as is illustrated in FIG. 4, may be utilized to determine the advance pilot shot timing angle. It is recognized and anticipated that the timing angle value may be zero during a particular fuel injection event. This value, however, will already be determined and available to ECM 56 at step 112 as discussed above. ECM 56 can thereupon add these three values, i.e. the timing trim angle value, the advanced pilot timing angle value, and the main shot timing angle value, and calculate the relative injection angle for the respective cylinder at step 112 in accordance with the formula set forth above.

At step 114, ECM 56 determines whether the relative injection angle value calculated at step 112 is greater than a maximum relative injection angle allowed for the particular cylinder selected at step 104. The maximum relative injection angle is a predetermined threshold value corresponding to the maximum angular value that the relative injection angle may be. If the relative injection angle value exceeds this value, then there is a likelihood that the pilot shot may be too advanced and adversely impact the overall performance and emissions of engine 12. In addition, such advanced pilot shot (if allowed to occur) may overlap with another shot in a fuel event for a different cylinder in engine 12, which may raise potential conflicts in ECM 56 control strategies. Checking that the relative injection angle is less than a maximum relative injection angle value ensures that one cylinder's fuel injection signal cannot overlap with the fuel injection signal of another cylinder. If there is overlap, a portion of an injection event for one cylinder may be cut off when another cylinder is having fuel injected into it. Although it is preferred in one embodiment that the signals for two cylinders do not overlap, an overlap condition is possible in an alternate embodiment of the present invention. In such alternate embodiment, however, it is recognized that the electronics equipment associated with the generation of the signals might need to be more robust in order to be operable to handle higher power levels associated with simultaneously generating multiple fuel injection signals to multiple cylinders at the same time. Those skilled in the art will appreciate that this may raise the cost of the electronics, and therefore the cost of the overall engine.

In yet another embodiment of the present invention, a second maximum injection angle value may be established for a second cylinder in the engine. The maximum injection angle value of the cylinder selected at step 104 may then be compared to the maximum injection angle value of the second cylinder to ensure that there will not be any overlap between the respective fuel injection events of the two cylinders, and the maximum injection angle value for the cylinder selected at step 104 may thereupon be determined based upon such comparison and the maximum relative injection angle value of the second cylinder. It is also recognized and anticipated that the maximum injection angle of any particular cylinder may be compared to the maximum injection angle of any plurality of cylinders including all cylinders of the engine to insure that no conflicts or injection collisions will occur across the entire spectrum of injection events for any plurality of cylinders.

Accordingly, if ECM 56 determines at step 114 that the relative injection angle calculated at step 112 is greater that the maximum relative injection angle allowed therefor, then at step 116 ECM 56 sets the value of the relative injection angle to the maximum relative injection angle allowed, and proceeds to step 118. On the other hand, if ECM 56 determines at step 114 that the relative injection angle value calculated at step 112 is not greater than the maximum relative injection angle allowed therefor, then ECM 56 simply proceeds to step 118. It is recognized and anticipated that the maximum injection angle value may be dynamically variable in one embodiment of the present invention. Such value may be calculated dynamically based upon engine operating conditions at the time; it may be determined by an appropriate timing sensor that is active at the time; it may be determined from other maps or tables associated with ECM 56; or the dynamic determination of the maximum injection angle value may be incorporated in software associated with ECM 56; or in any other manner known in the art. The limits associated with this determination may likewise vary based upon engine operating conditions, injection strategies and other factors.

In one embodiment, the absolute injection angle for the injection event may be determined. As will be discussed, the absolute injection angle may be used to directly compare the desired injection timing of one injection event to that of another for a different cylinder. At step 118, ECM 56 calculates the absolute injection angle for the cylinder selected at step 104 in accordance with the following formula:

Absolute injection angle=Cylinder *TDC* Offset+Relative Injection Angle

The cylinder top-dead-center (TDC) offset value is a predetermined angular value for each cylinder which corresponds to the angular offset of the respective cylinder relative to the angular position of the crankshaft about a longitudinal axis thereof. Typically, each cylinder in an engine will have a unique top-dead-center offset angular value associated therewith. In a typical six cylinder engine, a complete fuel injection event corresponds to four piston strokes, which amounts to two full revolutions (360°) of the crankshaft, thereby amounting to 720° of rotation per fuel injection event. The six cylinders may thereby have individual TDC offset angular values of 0°, 120°, 240°, 360°, 480°, and 600°. Accordingly, each cylinder's TDC offset value is a unique angular value, and each cylinder's respective TDC offset value is preferably available to ECM 56 as stored in a memory or other data storage means associated therewith. Accordingly, ECM 56 can calculate the absolute injection angle for the respective cylinder at step 118 by adding its already known TDC offset angular value and its relative injection angle value determined in steps 112 through 116. The absolute injection angle is the location of the relative injection angle with respect to the engine stroke cycle as referenced above.

At step 120, ECM 56 updates the absolute injection angle value for the cylinder selected at step 104. Such value is preferably stored in a register or other computer readable medium or device logically associated with that cylinder, but it is recognized and anticipated that any means or method known in the art may be utilized for the storage purpose without departing from the spirit and scope of the present invention. Such updated absolute injection angle value may be used thereafter for the fuel shots corresponding to the respective fuel injection event to be delivered to the cylinder at that rotational angle of the crankshaft during a particular fuel injection event.

At step 122, ECM 56 determines whether all the cylinders in engine 12 have received new absolute injection angle values for the respective fuel injection event. If all cylinders have received a new absolute injection angle value at step 122, then execution is terminated at step 124. On the other hand, if ECM 56 determines at step 122 that all cylinders in engine 12 have not yet received a new absolute injection angle value, then ECM 56 proceeds to step 104 once again and selects the next cylinder in engine 12 and proceeds to repeat the steps discussed above for the next cylinder selected at step 104.

In one embodiment of the present invention, the engine load and speed are established, and utilized to determine the parameters of a fuel injection event for a particular cylinder, including the number of shots, and the timing and fuel quantity of each shot. The injection event is then converted to an absolute injection angle. That is the timing of the shots of the injection event, e.g., the pilot shot, main shot, and anchor shot, are converted to an absolute injection angle. The absolute injection angles of the injection event are then compared with the absolute injection angles of at least one other cylinder, to ensure that no injection overlaps exists. In one embodiment, the absolute angles of an injection event may be combined to form a range. That is, from the start of injection of the pilot to the end of injection on the anchor would form an injection range. The absolute injection range of one cylinder may be compared to at least one other one to determine if there will be an injection overlap. In one embodiment, if there is an injection overlap, the pilot shot of the overlapping injection event may be delayed, trimmed, or eliminated. If the pilot is trimmed or eliminated, the ECM (56) redistributes the quantity of fuel that was allocated to the pilot, to the other shots.

Industrial Applicability

As described herein, the present apparatus and method has particular utility in all types of engines, such as engines utilized in vehicles, work machines, marine vessels, electrical generators, stationary engines, and the like. The present apparatus and method, therefore, provides a control system and method for determining the absolute angular value corresponding to the start time for the fuel injection events for each cylinder at all engine speeds. It is anticipated that the number of fuel injections for a particular injection event may vary based on various predetermined conditions such as present engine operating conditions, ambient conditions, and the like. It is recognized that the present apparatus and method will have utility to determine the start angle for the first shot in a fuel injection signal during all such engine operation conditions.

Those skilled in the art will appreciate that a complete execution of the steps of flowchart 100 will update the absolute injection angle values for each cylinder in engine 12. Such angular values will provide the respective angular position of the crankshaft whereat the fuel injection event for that particular cylinder will start. The appropriate number of fuel injection shots may then be delivered to each cylinder, including the respective amounts of fuel associated therewith, during each respective fuel injection event. ECM 56 can perform the steps of flowchart 100 in a continuous loop, and thus calculate the start angle for the fuel injection events for each cylinder for each fuel injection event. It is recognized and anticipated that this process may be performed more that once per fuel injection event and, in such embodiment, the start angle utilized for a fuel injection event will be the most recent value calculated therefor by the steps discussed herein.

It is recognized and anticipated that the specific threshold values, the time periods of engine speed monitoring by ECM 56, and the like, are preferably pre-programmed into ECM 56. Such values may be available in maps or tables stored in a memory means or data storage means associated with ECM 56. Alternatively, it is recognized that such values may be dynamically determined by appropriate formulas or mathematical computations to be performed by ECM 56 incorporated in the loop of flowchart 100, or at fixed time intervals. Accordingly, it is recognized and anticipated that ECM 56 may perform such steps in any one of such various ways known in the art.

It is preferred that the steps of flowchart 100, including the multiple execution of the loop formed by steps 104 through 122 (which occurs once for each cylinder in engine 12 for each fuel injection event) be repeated for each fuel injection event for the entire duration of operation of the engine. The interval between each such execution will typically be a function of the engine's current speed, but it is recognized and anticipated that such interval can be a predetermined time value, such as 15 microseconds for example, or such interval can be based upon some other relevant parameter or other predetermined criteria. Accordingly, it is intended that the claims will cover all such embodiments of the present invention that do not depart from the spirit and scope of the present invention. It is likewise recognized and anticipated that variations to the operating steps depicted in flowchart 100 of FIG. 3 could be made without departing from the spirit and scope of the present invention. In particular, steps could be added or some steps could be eliminated. All such variations are likewise intended to be covered by the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A fuel injection control system for determining a start angle for a fuel shot in a multi-shot fuel injection event, comprising:

at least one cylinder;

a piston in said cylinder movable through a plurality of piston strokes during the fuel injection event;

at least one fuel injection device operable to deliver a plurality of fuel injection shots to said at least one cylinder during the fuel injection event;

a controller coupled to said at least one fuel injection device and operable to determine a desired number of fuel injection shots in the fuel injection event and a desired amount of fuel for each of said desired number of fuel injection shots;

the controller being further operable to determine a relative injection angle value for said fuel injection event.

2. The fuel injection control system as set forth in claim 1 wherein the controller is operable to convert a predetermined timing trim value associated with said at least one fuel injector to an angular trim value, said relative injection angle value being based upon said angular trim value.

3. The fuel injection control system as set forth in claim 1 wherein the controller is further operable to determine an absolute injection angle value for said fuel injection event based upon said relative injection angle value.

4. The fuel injection control system as set forth in claim 3 wherein said absolute injection angle value corresponds to a position of said piston during the fuel injection event.

5. The fuel injection control system as set forth in claim 3 including a computer readable medium associated with said at least one cylinder and coupled to said controller, said controller being operable to output a signal indicative of said absolute injection angle value to said computer readable medium.

6. The fuel injection control system as set forth in claim 1 wherein said relative injection angle value is further based upon an advanced first shot timing angle value for said at least one cylinder, and a subsequent fuel shot timing angle value for said at least one cylinder.

7. The fuel injection control system as set forth in claim 6 wherein said advanced first shot timing angle value is an advanced pilot timing angle value, and said subsequent fuel shot timing angle value is a main shot timing angle value.

8. The fuel injection control system as set forth in claim 3 wherein said absolute injection angle value is further based upon a top-dead-center offset value for said at least one cylinder.

9. The fuel injection control system as set forth in claim 1 wherein said fuel injection event includes at least a pilot shot and a main shot, said start angle for the fuel injection event corresponding to the position of said piston during the fuel injection event when said pilot shot is desired to be delivered to said at least one cylinder.

10. The fuel injection control system as set forth in claim 1 wherein said fuel injection event includes at least a main shot, said start angle for the fuel injection event corresponding to the position of said piston during the fuel injection event when said main shot is delivered to said at least one cylinder.

11. The fuel injection control system as set forth in claim 2 wherein said predetermined timing trim value associated with said at least one fuel injector is converted to an angular value corresponding to a position of said piston during the fuel injection event based upon use of the formula:

$$\text{angular value} = \text{timing trim value} \times 6 \times \text{current engine speed.}$$

12. The fuel injection control system as set forth in claim 11 wherein the position of said piston ranges between 0° and 720° during the fuel injection event.

13. The fuel injection control system as set forth in claim 1 wherein the controller is operable to compare said relative injection angle value to a predetermined maximum relative injection angle value and thereafter set said relative injection angle value to the predetermined maximum relative injection angle valve if the relative injection angle value exceeds said predetermined maximum relative injection angle value.

14. A computer readable medium containing instructions for controlling a fuel injection control system for determining a start angle for a fuel shot in a multi-shot fuel injection event for an engine comprising:
   selecting one cylinder in the engine; and
   determining a relative injection angle value of the multi-shot fuel injection system for said selected cylinder.

15. The computer readable medium as set forth in claim 14 further comprising converting a predetermined timing trim value for a fuel injector associated with said selected cylinder to an angular trim value, said relative injection angle value for said selected cylinder being based upon said angular trim value.

16. The computer readable medium as set forth in claim 14 further comprising determining an absolute injection angle value for such selected cylinder based upon said relative injection angle value, said absolute injection angle value corresponding to a position of a piston in said selected cylinder during the fuel injection event.

17. The computer readable medium as set forth in claim 16 further comprising outputting a signal indicative of said absolute injection angle value.

18. The computer readable medium as set forth in claim 17 wherein said outputted signal is delivered to a second computer readable medium associated with said selected cylinder.

19. The computer readable medium as set forth in claim 15 wherein said multi-shot fuel injection event includes at least a pilot shot and a main shot, said relative injection angle value being determined by adding timing trim angle value, a predetermined advanced pilot timing angle value for said selected cylinder, and a predetermined main shot timing angle value for said selected cylinder.

20. The computer readable medium as set forth in claim 16 wherein said absolute injection angle value is determined by adding said relative injection angle value and a predetermined top-dead-center offset value for said selected cylinder.

21. The computer readable as set forth in claim 15 wherein said predetermined timing trim value is converted to an angular trim value based upon use of the formula:

$$\text{angular trim value} = \text{timing trim value} \times 6 \times \text{current engine speed.}$$

22. The computer readable medium as set forth in claim 21 wherein said computer readable medium can access a predetermined maximum relative injection angle value and thereafter set said relative injection angle value to the predetermined maximum relative injection angle value if the determined relative injection angle value exceeds said predetermined maximum relative injection angle value.

23. A method for determining a start angle for a fuel shot in a multi-shot fuel injection event for an engine comprising:
   selecting a cylinder in the engine;
   determining a relative injection angle value for said selected cylinder;
   establishing a maximum relative injection angle value for the selected cylinder;
   comparing the determined relative injection angle value to the predetermined maximum relative injection angle value; and
   setting said relative injection angle value to said predetermined maximum relative injection angle value if the determined relative injection angle value exceeds said predetermined maximum relative injection angle value.

24. The method as set forth in claim 23 further comprising the step of converting a predetermined timing trim value of a fuel injector associated with said selected cylinder to an angular trim value.

25. The method as set forth in claim 24 wherein said relative injection angle value is based upon said angular trim value.

26. The method as set forth in claim 23 further comprising the steps of:
   determining an absolute injection angle value based upon said relative injection angle value; and
   outputting a signal indicative of said absolute injection angle value.

27. The method as set forth in claim 26 further comprising the step of:
   updating a second computer readable medium associated with said selected cylinder with said determined absolute injection angle value.

28. The method as set forth in claim 21 wherein said relative injection angle value is determined by adding said timing trim angle value, a predetermined advanced pilot timing angle value for said selected cylinder, and a predetermined main shot timing angle value for said selected cylinder.

29. The method as set forth in claim 28 wherein the predetermined advanced pilot timing angle value is zero.

30. The method as set forth in claim 26 wherein said absolute injection angle value is determined by adding said relative injection angle value and a predetermined top-dead-center offset value for said selected cylinder.

31. The method as set forth in claim 24 wherein said angular trim value is equal to the product of:

$$\text{timing trim value} \times 6 \times \text{current engine speed.}$$

32. The method as set forth in claim 23 wherein the step of establishing a maximum relative injection angle value includes the steps of:
   selecting a second cylinder;
   establishing a second maximum relative injection angle value for said second cylinder;

determining said maximum relative injection angle for the selected cylinder based upon said second maximum relative injection angle value.

33. A method for determining a start angle for a fuel shot in a multi-shot fuel injection event for an engine, the fuel injection event being associated with a cylinder of the engine, comprising the steps of:

determining an injection parameter associated with the fuel injection event;

comparing the injection parameter to a second injection event, said second injection event being associated with a second cylinder of the engine;

determining whether the injection event overlaps said second injection event in response to said comparison; and modifying the fuel injection event when the injection event overlaps with said second injection event.

34. A method, as set forth in claim 33, wherein said injection parameter is a relative injection angle of a first shot of the injection event.

35. A method, as set forth in claim 33, wherein said injection parameter is an injection range of the injection event.

* * * * *